(No Model.)
D. LIPPY.
FLEXIBLE PIPE CONNECTION.
No. 460,073. Patented Sept. 22, 1891.
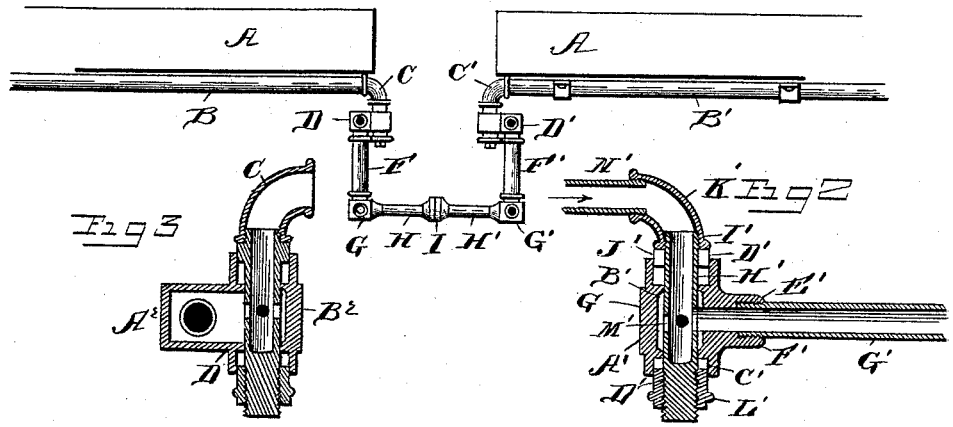
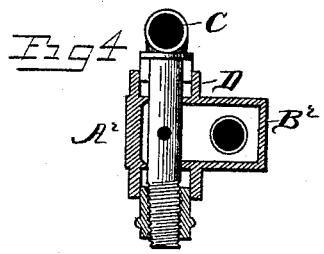
WITNESSES:
INVENTOR
David Lippy,
by Thomas E. Barrow,
Attorney.

United States Patent Office.

DAVID LIPPY, OF MANSFIELD, ASSIGNOR OF ONE-HALF TO DANIEL L. SPOTTS, OF CANTON, OHIO.

FLEXIBLE PIPE CONNECTION.

SPECIFICATION forming part of Letters Patent No. 460,073, dated September 22, 1891.

Application filed March 12, 1891. Serial No. 384,764. (No model.)

*To all whom it may concern:*

Be it known that I, DAVID LIPPY, a citizen of the United States, residing at Mansfield, in the county of Richland and State of Ohio, have invented certain new and useful Improvements in Flexible Pipe Connections; and I do declare the following to be a full, clear, and exact description of the invention, such as will enable others skilled in the art to which it appertains to make and use the same.

My invention relates to improvements in flexible pipe connections, and has special reference to pipe connections between railway-cars for steam to heat the cars and air-brake connections.

The leading object of my invention is to provide a metallic flexible pipe connection.

A further object is to dispense with the rubber tubes which are now in general use and to obviate all danger of the connections becoming defective, which is often the case with rubber-tube connections.

My invention also possesses merit in points of simplicity, durability, and cheapness, and is efficient in operation.

I attain the objects stated by the mechanism described and illustrated, so that the operation and advantages of my invention may be readily understood. I have shown a device embodying my invention in the accompanying drawings.

Figure 1 represents a side view of the flexible pipe connections complete coupled together in the center and connected to two portions of the frames of cars. Fig. 2 is a top sectional view of the lower single-joint connection enlarged, showing its general construction. Fig. 3 represents a top sectional view of the double-joint connection enlarged, showing its general construction. Fig. 4 represents a side sectional view of same. Figs. 3 and 4 show the full construction of the double-joint connection.

Referring by letters to the drawings, in which similar letters of reference denote corresponding parts in the several views, A designates portions of the frames of two cars; B and B', pipes extending longitudinally underneath the center of the cars; C and C', elbows; D and D', double-joint connections; F and F', pipes which are secured into the double-joint connections; G and G', single-joint connections; H and H', pipes; I, center coupling. This constitutes the full connection from car to car.

One important feature of my invention is the novel construction of the double and single joint connections D and D', G and G'. These are illustrated in the enlarged views Figs. 2, 3, and 4. The single joint G is composed of the square body or case A', having an opening longitudinally through its center the body having a chamber B' in its center, and the opening C' in each end enlarged to receive packing and glands D'. One side of the body A' is provided with a boss or sleeve E', with an opening F' at right angles with the body. The said orifice is provided with female threads, and in this the pipe connection G' is secured. H' indicates a hollow bolt or stud, which is provided upon the inlet end with male threads I' and enlargement J', which forms a shoulder for the elbow K'. It also forms a packing-ring at one end of the body A'. The outer end of the bolt is left solid and provided with male threads, and upon which is placed the tension-nut L'. One or more orifices are made in the bolt D' to connect with the chamber, the air or steam passing through the inlet-pipe N', and through the hollow bolt D', through the opening M' into the chamber B', thence through the pipe G'. The object of the chamber B' is for the purpose of allowing a free passage to the steam or air at any angle in which the pipes may be one with the other. Packing is placed in the cavity C'. Then by tightening upon the nut L' forces the packing rings or glands into the cavity upon the packing, making a steam and air tight joint.

The double-joint connection D shown in Figs. 3 and 4 is constructed the same as the single joint, Fig. 2. Each joint is constructed with the same parts, except having a double case $A^2$ and $B^2$ and a chamber connecting one with the other.

The operation of my invention will be readily understood from the foregoing description; but I will further state that after the parts are arranged as shown in Fig. 1 a perfect flexible joint connection will be made from one case to the other which will conform to any motion or position of the cars when in motion.

Having fully described my invention, what I claim as new, and desire to secure by Letters Patent, is—

1. A joint for flexible pipe connections, consisting of a case or body having a longitudinal opening, a central chamber, enlarged opening at each end, and a threaded boss at one side, the hollow bolt having apertures into the said chamber, said bolt being threaded at one end and having enlargement at the other, forming a shoulder for the elbow, and a packing-ring, and the tension-nut on the threaded end of the said bolt fitting the enlarged opening of the body at that end, and the elbow engaging the other end of the bolt and resting upon the said enlargement, substantially as specified.

2. A joint for flexible pipe connections, consisting of a case or body having a longitudinal opening, a central chamber, enlarged opening at each end, and a threaded boss at one side, the hollow bolt having apertures communicating with the said chamber and threaded at one end and formed with enlargement at the other end, forming a shoulder, and a packing-ring, the tension-nut on the threaded end of the said bolt the pipe, connection held in said boss, the elbow secured upon the hollow bolt and resting against the shoulder thereof and fitted in the enlarged opening of the case or body at that end, and the inlet-pipe connecting with the said elbow, substantially as shown and described.

In testimony whereof I affix my signature in the presence of two witnesses.

DAVID LIPPY.

Witnesses:
W. S. WARD,
HENRY C. McCLUER.